United States Patent [19]

Bortolin et al.

[11] Patent Number: 4,846,544

[45] Date of Patent: Jul. 11, 1989

[54] METHOD OF INTERCONNECTING OPTICAL FIBER CABLES AND CONNECTOR THEREFORE

[75] Inventors: Bruno Bortolin, Cinisello Balsamo; Beniamino Mariani, Vedano al Lambro, both of Italy

[73] Assignee: Societa' Cavi Pirelli S.p.A., Milan, Italy

[21] Appl. No.: 249,784

[22] Filed: Sep. 27, 1988

[30] Foreign Application Priority Data

Oct. 14, 1987 [IT] Italy .................................. 22261 A/87

[51] Int. Cl.$^4$ ................................................ G02B 6/38
[52] U.S. Cl. ............................. 350/96.21; 350/96.18; 350/96.20; 350/320
[58] Field of Search ............... 350/96.18, 96.20, 96.21, 350/96.22, 96.23, 320

[56] References Cited

U.S. PATENT DOCUMENTS

| | | | |
|---|---|---|---|
| 4,148,557 | 4/1979 | Garvey | 350/96.21 |
| 4,265,511 | 5/1981 | Nicia et al. | 350/96.18 |
| 4,368,948 | 1/1983 | Despouys | 350/96.20 |
| 4,418,983 | 12/1983 | Bowen et al. | 350/96.21 |
| 4,422,715 | 12/1983 | Williams et al. | 350/96.20 |
| 4,435,036 | 3/1984 | Sasakawa | 350/96.20 |
| 4,607,911 | 8/1986 | Rhodes | 350/96.20 |
| 4,632,505 | 12/1986 | Allsworth | 350/96.21 |
| 4,679,895 | 7/1987 | Huber | 350/96.20 |
| 4,696,537 | 9/1987 | Bauer et al. | 350/96.20 |
| 4,707,067 | 11/1987 | Haberland et al. | 350/96.20 |
| 4,726,647 | 2/1988 | Kakii et al. | 350/96.21 |
| 4,747,656 | 5/1988 | Miyahara et al. | 350/96.20 |
| 4,762,389 | 8/1988 | Kaihara | 350/96.21 |
| 4,784,455 | 11/1988 | Sladen et al. | 350/96.20 |
| 4,799,759 | 1/1989 | Balyasny | 350/96.21 |

FOREIGN PATENT DOCUMENTS

| | | | |
|---|---|---|---|
| 2097149 | 10/1982 | United Kingdom | 350/96.18 |
| 2148536 | 5/1985 | United Kingdom | 350/96.18 |

Primary Examiner—William L. Sikes
Assistant Examiner—Brian M. Healy
Attorney, Agent, or Firm—Brooks Haidt Haffner & Delahunty

[57] ABSTRACT

A connector for connecting an optical fiber to another optical fiber or other optical signal receiving device, the connector having an elongated body with a central bore which is larger than the optical fiber with a protective layer thereon so that the latter freely slides in the bore. The body also has a pair of spaced reference elements or shoulders on its exterior surface, and a bushing with elastic fingers encircles the portion of the body with the shoulders and is longitudinally slidable between positions in which it engages one shoulder or the other shoulder. The bushing also has a ferrule with a bore for the passage of the bare optical fiber. Also, a method for accurately positioning the fiber in the connector, in which the fiber is cut while it extends from the ferrule and the bushing engages the shoulder farther from the cut, and the bushing is then moved so that it engages the other shoulder and is secured to the body.

14 Claims, 2 Drawing Sheets

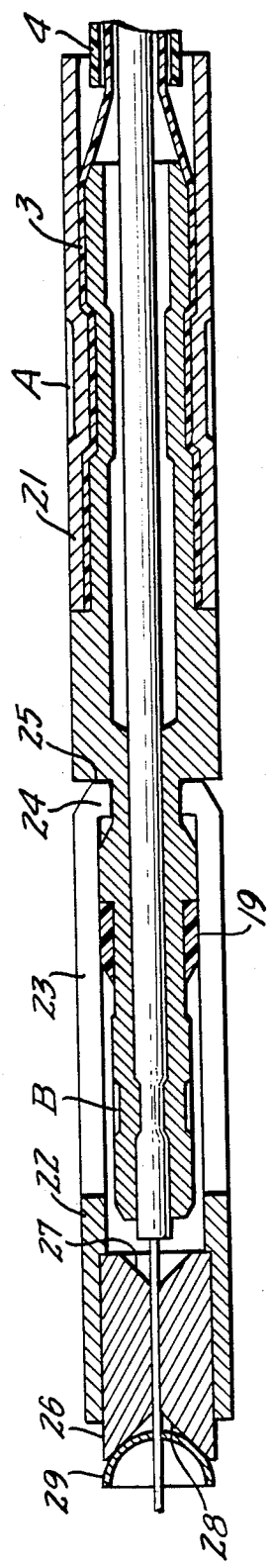
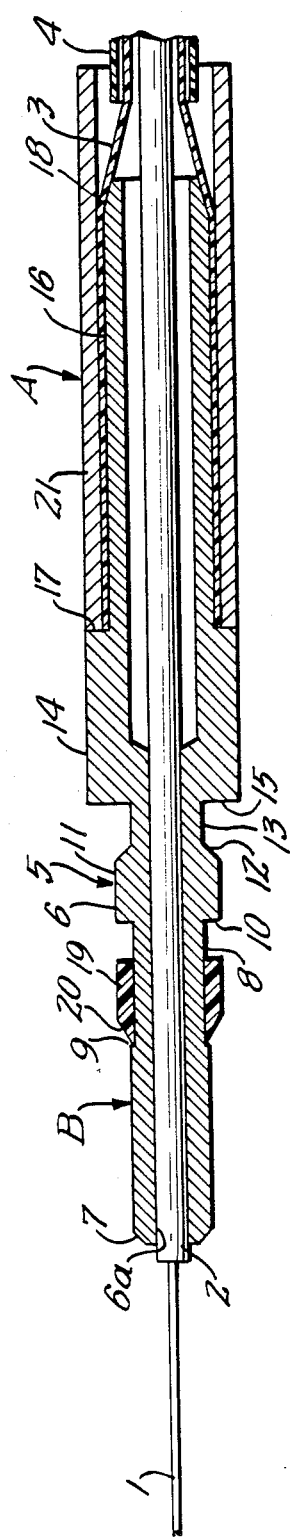
FIG. 2.
FIG. 1.

METHOD OF INTERCONNECTING OPTICAL FIBER CABLES AND CONNECTOR THEREFORE

BACKGROUND OF THE INVENTION

The present invention relates to a connector for optical fibers and to a method for the axial positioning of the end of an optical fiber at a pre-established point in the connector.

As is known, the most common methods for connecting two optical fibers are those employing a facing connector or an expanded beam connector. In the first case, the ends of the optical fibers are directly facing one another, must be placed in end-to-end mutual contact and must be perfectly aligned. In the second case, the optical connection is carried out by means of a lens (generally spherical or cylindrical) which produces an expanded collimated beam, and the ends of the optical fibers are situated in the focus of said lens.

For both types of connectors, the problem arises of having to position and to fix permanently, with the utmost precision, the end of the optical fiber at a certain point in the connector, and more precisely, at a point on the plane of contact of the two half-connectors in the case of the facing connector and at the focus of the lens in the case of the expanded beam connector.

A first, already-known solution requires the use of a micrometric device for the advancement of the optical fiber and of very sophisticated instrumentation to define the point which ensures the "optimum" connection. The results are quite satisfactory, but the connector is rather complicated and the carrying-out of the connection very difficult.

A second already known solution suggests the cutting of the optical fiber to the desired size and then, the insertion of it into the hole of a ferrule, having substantially the same diameter as that of the optical fiber, to cause the latter to advance axially inside said hole until its end comes into contact with a movable reference surface situated at the point in which said end must be positioned, and at least securing the optical fiber in that position. A method of this type is disclosed in U.S. application Ser. No. 050,061 filed May 13, 1987, now U.S. Pat. No. 4,807,958, assigned to the assignee of the present invention. This second solution involves the risk that during the insertion of the optical fiber, the operator, because of the friction encountered, may position the end of the optical fiber at a point other than the pre-established one. Moreover, it is possible that in the hole, there can be some scraps of material and that, during the insertion, such scraps lodge on the end of the optical fiber, strongly attenuating the signal or possibly even blocking light transmission from the end of the optical fiber.

SUMMARY OF THE INVENTION

One object of the present invention is to overcome the above-indicated inconveniences and limitations of the conventional techniques by the use of a connector which allows, at first, the insertion of the optical fiber in the ferrule and then, its cutting and positioning in the connector and by the use of a method, extremely simple and accurate, for positioning the end of the optical fiber in the connector.

The preferred embodiment of a connector of the present invention is characterized in that it comprises:

an elongated body provided with a central hole, in which an optical fiber is inserted and fixed in position, the body having at least a first and a second reference element or stops on its outer surface and the reference elements being axially spaced from each other;

a bushing provided at one of its ends with a positioning element having a shape complementary to the shape of the reference elements and able to engage them; and a ferrule provided with a central hole in which the terminal portion of the optical fiber is inserted, the ferrule being secured to an end portion of the bushing opposite to that end having the positioning element, the ferrule and the bushing being axially movable with respect to the elongated body and the ferrule being able to slide on the terminal portion of the optical fiber so as to take at least two pre-established fixed positions, one for the processing of the terminal portion of the optical fiber and corresponding to the coupling of the positioning element with the first reference element, and the other for the axial positioning of the terminal portion of the optical fiber in the connector and corresponding to the coupling of the positioning element with the second reference element.

Preferably, the two reference elements are shoulders on the elongated body, the surfaces of which are accurately spaced.

Preferably, the diameter of the hole of the elongated body is greater than the diameter of the adherent protection of the optical fiber to permit free passage of the fiber.

Preferably, also, the central hole of the ferrule has a diameter substantially equal to the diameter of the optical fiber and the ferrule has an internal recess of conical shape.

A further object of the invention is a method for the axial positioning of the end of an optical fiber at a pre-established point in a connector, characterized in that the method comprises the following steps:

inserting and fixing the optical fiber inside a fixed part of the connector;

applying a movable part of the connector on said fixed part until the positioning element of the movable part is positioned at a first reference point of said fixed part and inserting the end portion of the optical fiber in said movable part of the connector;

cutting the optical fiber at a distance, from the pre-established positioning point, which is sbstantially equal to the axial distance between said first reference point and a second reference point of said fixed part;

moving said movable part along said fixed part until the positioning element is situated on the second reference point of said fixed part; and securing said movable part on said fixed part of the connector.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a side elevation view, partly in crosssection, of a portion of the preferred embodiment of the connector of the invention;

FIG. 2 is similar to FIG. 1 and illustrates the position of the parts during the cutting of the optical fiber;

DETAILED DESCRIPTION OF THE INVENTION

Figure 4:
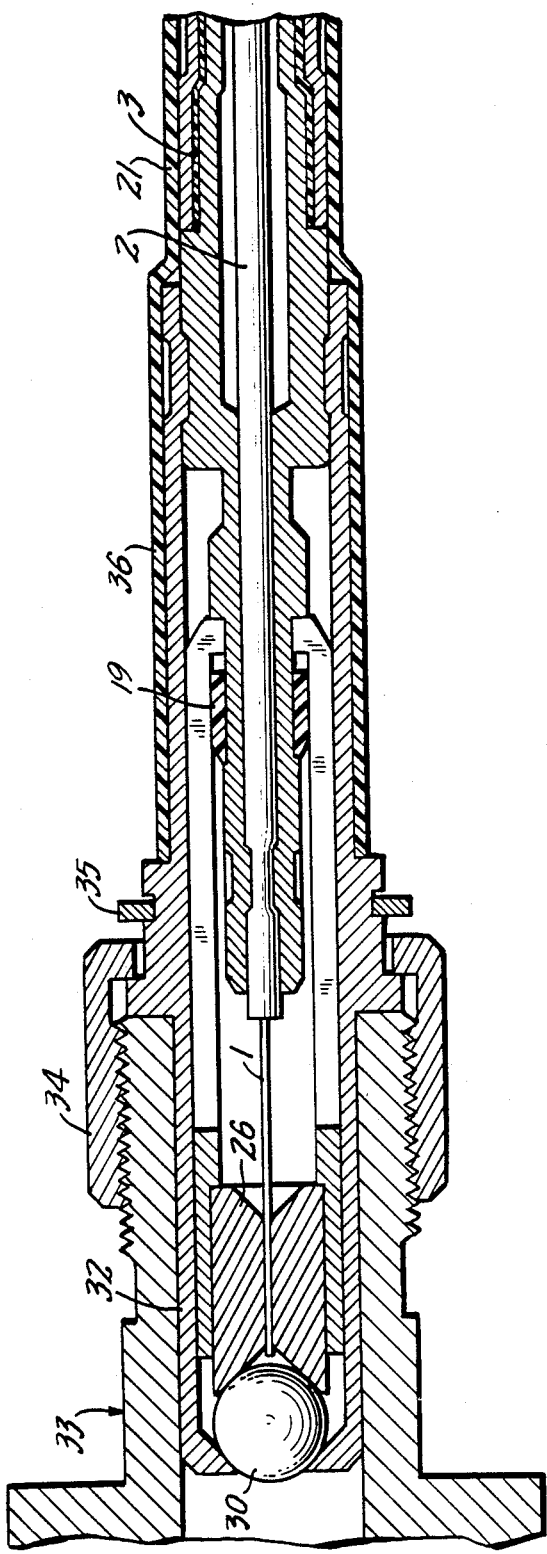
FIG. 4 is similar to FIG. 3 and illustrates the connection of the connector to a receptacle or coupler.

The connector illustrated in the drawings is of the expanded beam type and is able to connect the two ends of two elementary optical fiber cables comprising an optical fiber provided with adherent protective coverings, such as, for instance, nylon, with reinforcing elements, such as aramide yarns, e.g. Kevlar yarns, and with an outer sheath of plastic material, such as, for instance, polyurethane.

The structures of the connector and of the cables are not to be considered as restrictive, since the connector forming the subject of the invention can be applied also to facing connections and to cables of different types with one or more optical fibers, as well as to appropriately protected and reinforced optical fibers rather than to cables as such.

With reference to FIG. 1, the reference numeral 1 indicates an optical fiber surrounded by an adherent protective covering 2 made of nylon, by reinforcing yarns 3 made of aromatic polyamides, such as, for instance, Kevlar (DuPont trademark) yarns, and by an outer sheath 4 of polyurethane.

The optical fiber 1 is inserted in a connector portion 5 constituted by an elongated cylindrical body 6, made of metal, such as, for instance, brass, and provided with a central bore 6a. The diameter of the bore of said cylindrical body 6 is such as to allow the free passage, substantially without any friction, of the optical fiber 1 together with its adherent protective covering 2.

The external surface of the cylindrical body 6, starting from the left, as viewed in FIG. 1, has a first chamfer 7, a first circular recess 8 which defines a first shoulder 9 and a second shoulder or stop 10, a first annular ridge 11 connected through a second chamfer 12 to a second, central circular recess 13, a second annular ridge 14 which defines a third shoulder or stop 15, a third circular recess 16 which defines a fourth shoulder 17, and a third chamfer 18 at the rear terminal part.

All the shoulders are orthogonal to the axis of the cylindrical body 6. Moreover, the height of the second annular ridge 14 is greater than the height of the first annular ridge 11.

A sleeve 19, made of polymeric material like acetalic resins, such as, for instance, Delrin (DuPont trademark), having an inner diameter greater than the outer diameter of the first recess 8, but slightly smaller than the outer diameter of the front part of the cylindrical body 6 and a chamfer 20 at its front part, is, by virtue of its elasticity, applied on the cylindrical body 6 until it is disposed at the first recess 8, where it can freely slide between the first shoulder 9 and the second shoulder 10.

In the assembling of connector portion 5, a part of the outer sheath 4 of polyurethane, then a part of the reinforcing yarns 3 of Kevlar, and finally, a part of the adherent protective covering 2 of nylon are sequentially removed from the end of an optical fiber 1 before the fiber is inserted in the body 6.

Then, a metal sleeve 21, made, for instance, of brass, having an inner diameter greater than the outer diameter of the rear recess 16, is applied over the outer sheath 4 of the optical fiber 1, and the optical fiber 1, together with its adherent protection 2, is inserted in the central bore 6a of the hollow cylindrical body 6.

The optical fiber 1 is positioned in such a way that its part devoid of protections protrudes out of the front part of the cylindrical body 6 and that there is a contact only between the adherent protective covering 2 of the optical fiber 1 and the wall of the bore 6a.

The reinforcing yarns 3, made, for example, of Kevlar, are positioned on the rear or third recess 16 of the cylindrical body 6. Thereafter, the sleeve 21 is moved to the left until it abuts against the fourth shoulder 17 so that the reinforcing yarns 3 are held between the sleeve 21 itself and the rear recess 16. Finally, by clamping pliers, in the zone indicating with arrow A, sleeve 21 is compressed circumferentially so as to secure the reinforcing yarns 3 to the cylindrical body 6.

Subsequently, in the zone indicated by the arrow B, the front part of the cylindrical body 6 is pressed circumferentially by clamping pliers so as to secure the adherent protective covering 2 of nylon, and consequently, the optical fiber 1, to the cylindrical body 6.

FIG. 2, besides the elements described in connection with FIG. 1, shows a metal bushing 22, made, for instance, of brass, which has an inner diameter greater than the outer diameter of the first annular ridge 11, an outer diameter substantially equal to that of the second annular ridge 14, and a plurality of longitudinal slots to provide a plurality of flexible fingers 23.

The ends of the fingers 23 have inwardly extending projections 24, the end surfaces 25 of which are orthogonal to the bushing axis, and a ferrule 26 is inserted in and secured to the opposite end of the bushing 22.

Ferrule 26 is provided with a central bore having substantially the same diameter as that of the optical fiber 1 and has, at its ends, a recess 27 and a recess 28 of conical shape.

Bushing 22, having elastic fingers 23, is applied on the cylindrical body 6 and, by means of sleeve 19 and its chamfer 20, is positioned with its projections 24, in the central or second recess 13 so that the end sufaces abut the third shoulder 15.

At the same time, the terminal portion of the optical fiber 1 is inserted in the central bore of the ferrule 26 (aided in this operation by the inner conical recess 27) so that its free end extends from said bore as shown in FIG. 2.

A conventional cutter for optical fibers (not shown in the drawings) having at its end a hollow semi-sphere 29 provided with a central hole, is arranged in the conical recess 28 of the ferrule 26 in such a way that the terminal portion of the optical fiber 1 is in the central hole of the hollow semi-sphere 29 and the two surfaces, the spherical surface of the semi-sphere 29 and the conical surface 28, are in mutual contact. The cutter is adjusted so as to cut the optical fiber 1 at a distance from the focus of the hollow semi-sphere 29 which is exactly equal to the distance existing between the second shoulder 10 and the third shoulder 15.

After cutting of the optical fiber 1, the cutter and the hollow semi-sphere 29 are removed and bushing 22, together with ferrule 26, is moved to the left, with the aid of the chamfer 12, until its projections 24 are positioned in the first recess 8, the sleeve 19 moving to the left with the bushing 22. Besides cutting, any processing, such as, for instance, a lapping or a cleaning of the end of the optical fiber 1, can be carried out on the terminal portion of said optical fiber 1 before moving the bushing 22.

Figure 3:
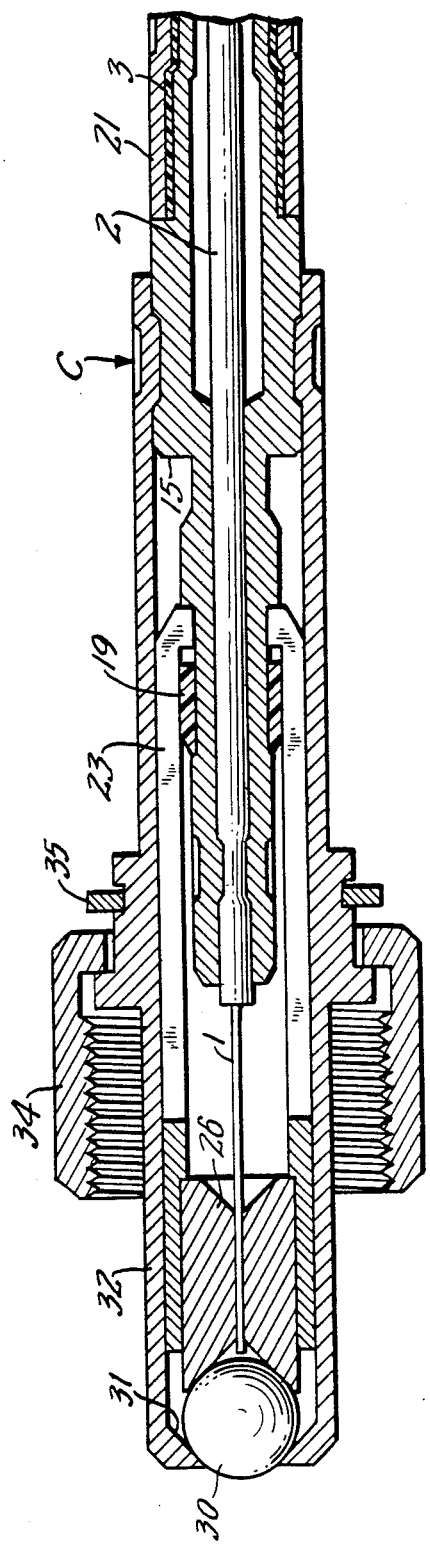
FIG. 3 is similar to FIG. 2 and illustrates the positions of the parts after cutting of the optical fiber and movement of parts of the connector and the assembled connector.

FIG. 3, besides the elements described in FIGS. 1 and 2, illustrates a spherical lens 30, having a diameter equal to that of the hollow semi-sphere 29, which is centered and kept pressed against the outer conical recess 28 of ferrule 26 by a retaining surface 31 of conical shape and at the end of an outer metal sleeve 32 made, for instance, of brass.

The outer sleeve 32 also presses the fingers 23 of the bushing 22 inwardly and the end surfaces against the second shoulder 10 of the cylindrical body 6.

In an alternative embodiment, the outer surface of bushing 22 can be provided with ridges in proximity to the projections 24 and the bushing 22 can be correctly positioned by means of an elastic ring which engages with said ridges.

After the bushing 22 has been so enclosed by the sleeve 32, the outer sleeve 32 is compressed circularly by means of clamping pliers in the zone indicated with arrow C, so as to be secured to the cylindrical body 6.

Taking into account the fact that the hollow semi-sphere 29 and the spherical lens 30 have the same diameter, the fact that the optical fiber 1 has been cut at a distance from the focus of the hollow semi-sphere 29 which is equal to the distance between the second shoulder 10 and the third shoulder 15, and the fact that, after the cut of the optical fiber 1, bushing 22 is caused to advance on the optical fiber 1 through the exact distance existing between the third shoulder 15 and the second shoulder 10, it can be concluded that in these conditions, the end of the optical fiber 1 is exactly positioned at the focus of the spherical lens 30.

The reliability and precision of such positioning depend on the accuracy of the processing carried out on the surfaces of the second shoulder 10 and of the third shoulder 15. Since these surfaces are external, it is very easy, for example, by means of a numerical control lathe, to obtain processings with tolerances ranging between 1/10 and 1/100 of millimeter.

The above described positioning of the end of the optical fiber 1 refers to a connector of the expanded beam type, but the method can be applied also to a facing connector by the following modifications:

(1) replacing the ferrule 26 with the outer conical recess 28 with a ferrule having an outer end surface which is flat and orthogonal to its axis;

(2) replacing in the cutter, the hollow semi-sphere 29 with a member having a hole for receiving the optical fiber 1 and a flat surface which abuts the end surface of the modified ferrule; and (3) the optical fiber is cut at a distance from the ferrule surface equal to the distance between the second and the third shoulders of the cylindrical body.

In this way, when the bushing is again brought forward, or to the left, the end of the optical fiber is perfectly aligned with the outer surface of the ferrule.

FIG. 4, in addition to the elements described in the preceding figures, shows the connector inserted into a receptacle or coupler 33 which connects it to another connector or to an active element.

The connection of the connector to the coupling pipe 33 is effected in a conventional manner by means of a threaded ring nut 34 mounted on the outer sleeve 32 which is provided with an elastic ring 35 to prevent removal of the ring nut 33 from the sleeve 32.

To make the jointing waterproof, a heat shrinkable sleeve 36 is present on the rear part of sleeve 32 and the outer sheath 4 of the optical fiber 1. It is to be noted that the alignment of the connector is ensured by the coupling between the inner surface of the coupler 33 and the outer surface of sleeve 32.

Therefore, in order to ensure a good alignment, said surfaces are to be processed with sufficient accuracy.

As will be apparent, the invention accomplishes the objects set forth. In fact, the cylindrical body 6 with its axially spaced external recesses 8 and 13 and the bushing 22 axially movable on the cylindrical body 6 and with its fingers 23, enable the terminal portion of the optical fiber 1 to be inserted into the ferrule 26 before being cut, and then enable the ferrule 26 to slide on said terminal portion of the optical fiber 1 in such a way as to take two fixed positions, one for the cutting of the terminal portion of the optical fiber 1 and the other for the axial positioning of the end of the optical fiber in the connector portion 5. The fact that the terminal portion of the optical fiber 1 is cut after its insertion in the ferrule 26 ensures an ever clean condition of the end of the optical fiber so that it is in the "optimum" condition for the transmission of the optical signal.

Further, the positioning of the end of the optical fiber 1 is carried out by means of a few simple operations and with a reduced equipment, namely, two pliers and a cutter, so that it can be effected in the field by unskilled workers.

Also, the surfaces to be accurately processed are all external with a consequent saving in working time and costs.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A connector for connecting an optical fiber with an optical signal receiving means, said connector comprising:

an elongated body having a central bore for receiving an optical fiber, said body having a first reference element and a second reference element on its outer surface spaced from each other in the direction of the length of said body and having a free end, said first reference element being nearer said free end than said second reference element;

a bushing mounted on said body for longitudinal sliding movement on said body and extending around the portion of said body adjacent said free end thereof, said bushing having an end portion spaced longitudinally from said free end which, in a first longitudinal position, thereof is engageable with said second reference element and in a second longitudinal position thereof, is engageable with said first reference element; and a ferrule mounted at the opposite end of said bushing and secured to said bushing, said ferrule having a central bore for slidably receiving said optical fiber and said bore of said ferrule having an end remote from said free end of said body whereby with said bushing in said first longitudinal position thereof a said optical fiber can be inserted through the bore of said ferrule so that an end thereof extends from said end of said bore of said ferrule and outwardly of said body and cut to a predetermined length and with said bushing in said second longitudinal position thereof, the cut end of said fiber is nearer said end of said bore of said ferrule.

2. A connector as set forth in claim 1, wherein said elongated body and said bushing are cylindrical and wherein said bushing has a bore receiving said portion of said body.

3. A connector as set forth in claim 2 wherein said first reference element and said second reference element, are respectively, a first peripheral shoulder and a second peripheral shoulder on said body and wherein said first shoulder is receivable within the bore of said bushing.

4. A connector as set forth in claim 3 wherein each said shoulder has a bushing engaging surface facing toward said free end of said body and extending orthogonally to the axis of said body.

5. A connector as set forth in claim 4 wherein said end of said bushing has a surface facing away from said free end of said body and extending orthogonally to said axis of said body.

6. A connector as set forth in claim 2 wherein said end of said bushing has a plurality of elastic fingers, the ends of which are engageable with said first reference element in said second longitudinal position thereof and with said second reference element in said first longitudinal position thereof.

7. A connector as set forth in claim 3 wherein said body has a recess of a diameter smaller than the diameter of said first peripheral shoulder extending from said first peripheral shoulder toward said free end of said body.

8. A connector as set forth in claim 7 further comprising a sleeve of plastic material mounted in said recess for sliding movement longitudinally of said recess, said sleeve having an outer diameter substantially equal to the outer diameter of said first peripheral shoulder.

9. A connector as set forth in claim 8 wherein said sleeve tapers to a smaller diameter at its end remote from said first peripheral shoulder.

10. A connector as set forth in claim 3 wherein said body has a recess of a diameter smaller than the diameter of said first peripheral shoulder and said second peripheral shoulder and extending from said second shoulder toward, but terminating short of, said first shoulder.

11. A connector as set forth in claim 10 wherein said recess increases in diameter to the diameter of said first peripheral shoulder at its end portion nearer said first peripheral shoulder.

12. A connector as set forth in claim 1 wherein said central bore of said body has a diameter greater than the diameter of an optical fiber and any protective layer thereon to be received in the last-mentioned said bore to permit free sliding movement of the optical fiber in the last-mentioned said bore.

13. A method for the axial positioning of the end of an optical fiber at a predetermined point in a connector having an elongated body with a bore, a free end, first and second reference elements, the first reference element being intermediate the second reference element and said free end and being spaced from said second reference element, and a movable member slidably mounted on said body, said method comprising:
   inserting an optical fiber in said bore into a position in which an end thereof protrudes from said free end and extends outwardly of said movable member with a portion of said movable member adjacent said second reference element and securing said optical fiber to said body in said position;
   cutting said optical fiber at a distance from said predetermined point which is substantially equal to the longitudinal distance between said first reference element and said second reference element;
   sliding said movable member into a position thereof in which said portion thereof is adjacent said first reference element; and
   securing said movable member to said body in said position thereof.

14. A method as set forth in claim 1 further comprising inserting a cut measuring member over the free end of the optical fiber and engaging it with said movable member with said portion of said movable member adjacent said second reference element prior to cutting said optical fiber.

* * * * *